US012643789B2

(12) United States Patent
Rytter et al.

(10) Patent No.: US 12,643,789 B2
(45) Date of Patent: Jun. 2, 2026

(54) PRODUCTION OF HYDROCARBONS

(71) Applicant: Nordic Electrofuel AS, Lysaker (NO)

(72) Inventors: Erling Rytter, Trondheim (NO);
Magne Hillestad, Ranheim (NO); Rune Løvstad, Oslo (NO); Bjørn Øyvind Bringedal, Oslo (NO)

(73) Assignee: Nordic Electrofuel AS, Lysaker (NO)

( * ) Notice: Subject to any disclaimer, the term of this patent is extended or adjusted under 35 U.S.C. 154(b) by 791 days.

(21) Appl. No.: 17/906,413

(22) PCT Filed: Mar. 16, 2021

(86) PCT No.: PCT/EP2021/056733
§ 371 (c)(1),
(2) Date: Sep. 15, 2022

(87) PCT Pub. No.: WO2021/185869
PCT Pub. Date: Sep. 23, 2021

(65) Prior Publication Data
US 2023/0174376 A1 Jun. 8, 2023

(30) Foreign Application Priority Data

Mar. 17, 2020 (GB) ...................................... 2003855

(51) Int. Cl.
*C01B 3/382* (2026.01)
*B01J 12/00* (2006.01)
(Continued)

(52) U.S. Cl.
CPC ............. *C01B 3/382* (2013.01); *B01J 12/005* (2013.01); *C01B 3/16* (2013.01); *C01B 3/386* (2013.01);
(Continued)

(58) Field of Classification Search
CPC ........... C01B 3/382; C01B 3/16; C01B 3/386; C01B 2203/0244; C01B 2203/0261;
(Continued)

(56) References Cited

U.S. PATENT DOCUMENTS

| | | | |
|---|---|---|---|
| 5,714,657 A | 2/1998 | de Vries | |
| 6,527,980 B1 | 3/2003 | Roden et al. | |

(Continued)

FOREIGN PATENT DOCUMENTS

| | | |
|---|---|---|
| WO | 2017/072649 A1 | 5/2017 |
| WO | 2019/110266 A1 | 6/2019 |
| WO | 2019/175476 A1 | 9/2019 |

OTHER PUBLICATIONS

Notification of Transmittal of the International Search Report and the Written Opinion of the International Searching Authority, or the Declaration, issued for International Application No. PCT/EP2021/056733, entitled "Production of Hydrocarbons," mailed on Jun. 21, 2021.

(Continued)

*Primary Examiner* — Jafar F Parsa
(74) *Attorney, Agent, or Firm* — Hamilton, Brook, Smith & Reynolds, P.C.

(57) ABSTRACT

A process for producing syngas in a first reactor, the process comprising: feeding carbon dioxide, hydrogen and first hydrocarbons into the first reactor; at least partially oxidizing the first hydrocarbons in the first region of the first reactor; producing syngas from the carbon dioxide, hydrogen and the oxidized first hydrocarbons in a second region of the first reactor.

18 Claims, 6 Drawing Sheets

(51) Int. Cl.

| | |
|---|---|
| *C01B 3/16* | (2006.01) |
| *C01B 3/386* | (2026.01) |
| *C10G 2/00* | (2006.01) |

(52) U.S. Cl.
CPC ...... *C10G 2/332* (2013.01); *C01B 2203/0244* (2013.01); *C01B 2203/0261* (2013.01); *C01B 2203/0283* (2013.01); *C01B 2203/062* (2013.01); *C01B 2203/1235* (2013.01); *C01B 2203/1241* (2013.01); *C01B 2203/148* (2013.01); *C01B 2203/86* (2013.01)

(58) Field of Classification Search
CPC ...... C01B 2203/062; C01B 2203/1235; C10G 2/32; C10G 2/30
See application file for complete search history.

(56) References Cited

U.S. PATENT DOCUMENTS

| | | | |
|---|---|---|---|
| 2007/0237710 A1 | 10/2007 | Genkin et al. | |
| 2009/0012188 A1 | 1/2009 | Rojey et al. | |
| 2009/0126272 A1 | 5/2009 | Berggren et al. | |
| 2010/0177861 A1* | 7/2010 | Lecomte .................. | C01B 3/34 |
| | | | 376/325 |

OTHER PUBLICATIONS

Search Report issued for GB Application No. GB2003855.0, entitled "Triphenylbut-1-Ene Derivative," Apr. 27, 2020.

\* cited by examiner

PRODUCTION OF HYDROCARBONS

This application is the U.S. National Stage of International Application No. PCT/EP2021/056733, filed Mar. 16, 2021, which designates the U.S., published in English, and claims priority under 35 U.S.C. § 119 or 365(c) to Great Britain Application No. 2003855.0, filed Mar. 17, 2020. The entire teachings of the above applications are incorporated herein by reference.

The present invention relates to the production of hydrocarbons from carbon dioxide and hydrogen. In particular, the present invention relates to the production of syngas from carbon dioxide and hydrogen and the production hydrocarbons from the syngas.

BACKGROUND

It is commonly assumed that the greenhouse effect and the climate on earth are closely connected to human made emissions of $CO_2$. These emissions are primarily formed by combustion of coal and hydrocarbons, i.e. by generation of heat, electric power as well as use in internal combustion engines in vehicles. A desirable goal is to reduce the emission of $CO_2$ to the atmosphere. It is known art to reduce the emission of $CO_2$ from combustion of hydrocarbons by reforming and shift technology for preparation of a mixture consisting of hydrogen and carbon dioxide. These components can be separated, where after hydrogen is used for energy generation, heat or in different types of transportation, and carbon dioxide is deposited after compression to desired pressure. However, no such technology is operated today, at least in any appreciable amount. An alternative is to utilize hydrogen and $CO_2$ to produce fuels, waxes and other hydrocarbons for today's market, particularly diesel for transportation vehicles and waxes for a multitude of applications, including glues.

The present invention aims to at least partly solve the above problems by providing an alternative solution.

SUMMARY OF THE INVENTION

According to a first aspect of the invention, there is provided a process for producing syngas in a first reactor, the process comprising: feeding carbon dioxide, hydrogen and first hydrocarbons into the first reactor; at least partially oxidizing the first hydrocarbons in the first region of the first reactor; producing syngas from the carbon dioxide, hydrogen and the oxidized first hydrocarbons in a second region of the first reactor.

According to a second aspect of the invention there is provided an apparatus, or plant, for producing syngas comprising: a first reactor; at least one first input configured to feed carbon dioxide into the first reactor; at least one second input configured to feed hydrogen into the first reactor; at least one third input configured to feed first hydrocarbons into the first reactor; wherein the first reactor comprises: a first region configured to at least partially oxidize the first hydrocarbons; and a second region configured to produce syngas from the carbon dioxide, the hydrogen and the oxidized first hydrocarbons.

Optionally, at least a portion of the first hydrocarbons fed into the first reactor are first recycled hydrocarbons recycled from second hydrocarbons produced in a second reactor from the syngas.

According to a third aspect of the invention, there is provided a process for producing hydrocarbons from carbon dioxide and hydrogen, the process comprising: producing syngas from carbon dioxide and hydrogen in a first reactor; producing hydrocarbons from the syngas in a second reactor. The step of producing syngas may be performed using the process of the first aspect.

According to a fourth aspect of the invention, there is provided a system, an apparatus, or plant, for producing hydrocarbons from carbon dioxide and hydrogen, comprising: a first apparatus, or first reactor, configured to produce syngas from carbon dioxide and hydrogen; and a second reactor configured to produce hydrocarbons from the syngas. The first apparatus configured to produce syngas may be the apparatus of the second aspect.

Optionally, at least a portion of the first hydrocarbons fed into the first reactor are first recycled hydrocarbons recycled from the second hydrocarbons produced in the second reactor.

Optionally, multiple first reactors and/or second reactors may be used.

Optionally, the hydrogen is fed through a feed ring comprising multiple hydrogen feed lines penetrating a shell of the first reactor.

Optionally, the hydrogen added to the second region of the first reactor, with subsequent reverse-water-gas-shift reaction, cools the gas mixture to below 1200° C., preferably below 1100° C.

Optionally, the hydrocarbons produced in the second reactor comprise diesel, wax, jet fuel, methanol, and/or synthetic natural gas. Optionally, a major portion of the hydrocarbons is one of diesel, wax, jet fuel, methanol, or synthetic natural gas.

Optionally, at least a portion of the hydrocarbons produced in the second reactor are fed into the first reactor as first recycled hydrocarbons. Optionally, the first recycled hydrocarbons comprise at least unconverted syngas, methane and light hydrocarbons. Optionally, the light hydrocarbons comprise one or more of paraffins, olefins and oxygenates in the carbon range $C_2$-$C_5$.

Optionally, oxygen is fed into the first region of the first reactor. Optionally, oxygen is mixed with steam and/or a portion of the carbon dioxide before entering the first region of the first reactor. The oxygen may be in the form of neat oxygen, enriched oxygen, air or a combination thereof. Optionally, the amount of oxygen is below the amount needed for total combustion of the first recycled hydrocarbons, preferably below 90% of the amount, more preferably below 70%, more preferably below 50%. Optionally, the amount of oxygen is above 20% of the amount needed for total combustion of the first recycled hydrocarbons, preferably above 30%. Optionally, the amount of oxygen is larger than the amount needed for converting hydrogen, methane and higher hydrocarbons in the recycle gas to CO and water, preferably at least 5% larger than the amount, more preferably at least 10% larger than the amount. Optionally, the first region comprises a burner or partial oxidization reactor.

Optionally, the second region of the first reactor comprises a solid, inert material. Optionally, the solid, inert material comprises one or more of alumina, magnesia, silica, calcium oxide, zirconia, titania, cordierite and spinel. Optionally, the solid, inert material is substantially free from transition elements. Optionally, the solid, inert material is substantially free from nickel. Optionally, the solid, inert material is substantially free from palladium and/or other noble metals. Optionally, the solid, inert material comprises alumina, such as $\alpha$-alumina. Optionally, the solid, inert material comprises a spinel material containing aluminum. Optionally, the spinel material contains calcium and/or magnesium. Optionally, the solid, inert material comprises mostly cordierite. Optionally, the solid, inert material is in the shape of spheres, pellets, tubes, monoliths, or a solid disk with one ore multiple holes. The solid material may have one or several functions, including separation of reaction zones in the syngas reactor, providing a surface for reaction of radicals, and giving a flow restriction for favorable gas mixing. For example, one or a limited number of holes in an inert disk may cause enhanced gas flow that promotes gas mixing in the reaction compartment below the second reaction zone.

Optionally, the first recycled hydrocarbons are mixed with steam before being fed into the first reactor. Optionally, the first recycled hydrocarbons are mixed with steam in a pre-reformer, which converts at least a portion of the first recycled hydrocarbons to methane and carbon dioxide.

Optionally, the first recycled hydrocarbons are mixed with carbon dioxide before being fed into the first reactor. Optionally, at least 20% of the carbon dioxide input to the process is mixed with the first recycled hydrocarbons before being fed into the first reactor, more preferably at least 60%, and more preferably still 90%.

Optionally, the oxygen is mixed with carbon dioxide before being fed into the first reactor. Optionally, at least 10% of the carbon dioxide input to the process is mixed with the oxygen before being fed into the first reactor, more preferably at least 20%, and more preferably still 40%.

Optionally, a sufficient oxygen is added such that no or minimal soot is formed.

Optionally, a sufficient amount of oxygen is added so that the temperature in the second zone of the first reactor is beneficial for the reverse-water-gas-shift reaction to proceed without a catalyst; the temperature being above 900° C., preferably above 1000° C., more preferably above 1100° C.

Optionally, a sufficient amount of oxygen is added to minimize or reduce the amount of methane leaving the second region of the first reactor; the methane on a volume basis being less that 10 vol %, preferably below 5 vol %, more preferably below 2 vol %.

Optionally, the oxygen is mixed with steam before being fed into the first reactor. Optionally the amount of steam in oxygen on a molar basis is at least 20%, preferably between 25 and 50%.

Optionally, a major portion of the carbon dioxide is fed into a first region of the first reactor, and/or a major portion of the hydrogen is fed into a second region of the first reactor. Optionally, a minor portion of the hydrogen is fed into the first region of the first reactor, and/or a minor portion of the carbon dioxide is fed into the second region of the first reactor.

Optionally, the first recycled hydrocarbons are mixed with a combustible fuel before being fed into the first reactor. Optionally, the combustible fuel is natural gas and/or methane.

Optionally at least a portion of the hydrocarbons produced in the second reactor are fed into the second reactor as second recycled hydrocarbons.

Optionally, the process further comprises: removing liquid hydrocarbons produced in the second reactor. Optionally, the process further comprises: removing water from the hydrocarbons produced in the second reactor. Optionally, the process further comprises: removing unwanted gases from the hydrocarbons produced in the second reactor. The unwanted gases may comprise one or both of nitrogen and methane.

Optionally, the process further comprises: removing water from the syngas produced in the first reactor before feeding the syngas into the second reactor. Optionally, the process further comprises: removing impurities from the syngas produced in the first reactor before feeding the syngas into the second reactor.

Optionally, the process further comprises: removing carbon dioxide from the syngas produced in the first reactor before feeding the syngas into the second reactor.

Optionally, the process further comprises: adding further hydrogen to the syngas produced in the first reactor before feeding the syngas into the second reactor.

Optionally, the syngas is produced in the first reactor at least partly by a reverse water-gas-shift reaction. Optionally, the syngas is produced in the first reactor at least partly by steam-methane reforming. Optionally, the syngas is produced in the first reactor at least partly by autothermal reforming.

Optionally, the hydrocarbons are produced in the second reactor by a Fischer-Tropsch process. Optionally, the Fischer-Tropsch process is a low temperature Fischer-Tropsch process. Optionally the second reactor is a Fischer-Tropsch reactor of the tubular fixed-bed type. Optionally, a catalyst of the fixed-bed Fischer-Tropsch reactor is contained in tubes, cans and/or micro-channels.

Optionally, the process further comprises: upgrading the hydrocarbons produced in the second reactor.

Optionally, oxygen, the first recycled hydrocarbons, and optionally added $CO_2$ and/or fuel are fed to a burner at the first region of the first reactor. Optionally, a flame temperature of the burner is at least 1200° C., preferably at least 1500° C.

Optionally, oxygen, the first recycled hydrocarbons, and optionally added $CO_2$ and/or fuel are fed to a partial oxidation reactor at the first region of the first reactor.

Optionally, hydrogen and optionally added $CO_2$ is fed into the first rector between the first and second regions, e.g. below the burner or partial oxidation reactor.

Optionally, the first reactor is operated at an exit temperature above 800° C., preferable above 900° C., more preferably above 1000° C.

Optionally, the process further comprises cooling the syngas produced by the first reactor by a waste-heat boiler, gas-gas heat exchanger and/or direct water quenching.

BRIEF DESCRIPTION OF THE DRAWINGS

Further features of the present invention are described below by way of non-limiting examples and with reference to the accompanying drawings, in which:

FIG. 1 schematically shows a first example process;

FIG. 2 schematically shows a second example process;

DETAILED DESCRIPTION

Figure 3:
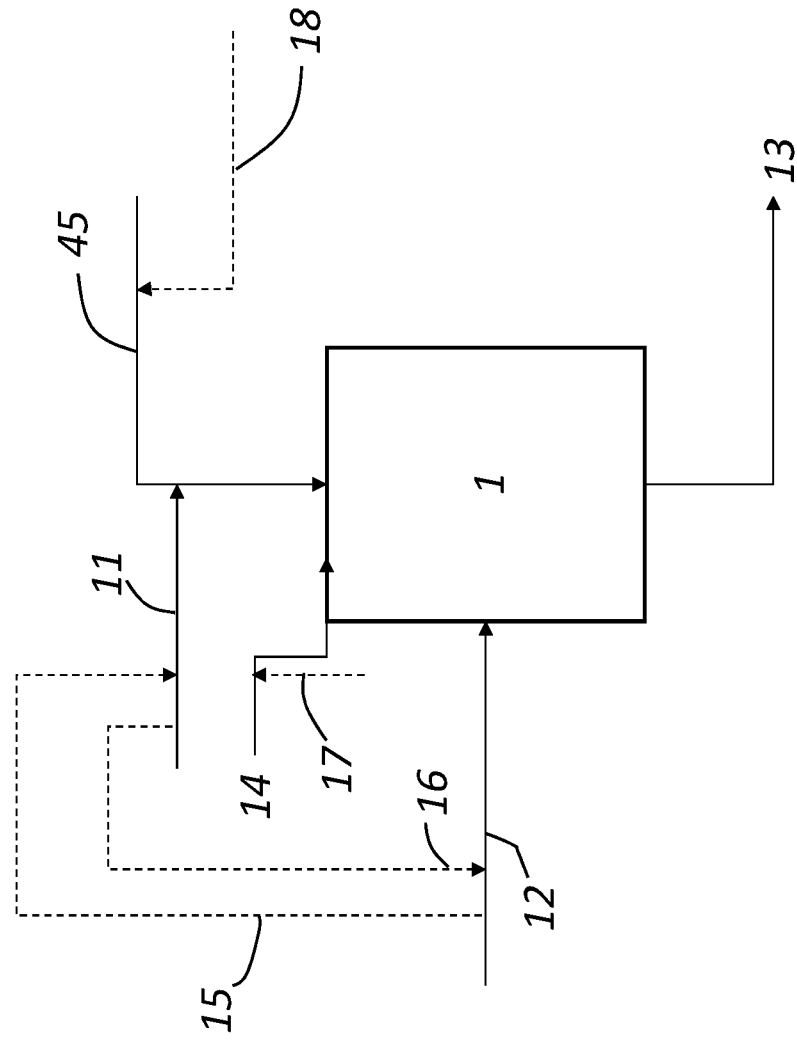
FIG. 3 schematically shows a first reactor for a third example process.

Hydrogen useful for the described process can be produced in a multitude of ways. One such way is electrolysis of water. Hydrogen in the transport sector as fuel for fuel cells is gaining increased attention, and fueling stations for transportation vehicles are being deployed in several areas of the world, notably in the USA, Europe and Japan. Practically all of these fueling stations are based on hydrogen made by splitting water through electrolysis and compressing hydrogen to typically 700 bar. Liquid hydrogen is being considered for heavier transport like ships and trains. Electric power for the electrolysis can come from renewable energy sources like wind power, hydroelectric power and photovoltaic solar cells. Other technologies like plasma splitting, direct catalytic water splitting, and high-temperature water splitting are being explored. It is also possible to obtain benign hydrogen from reforming of natural gas followed by depositions of $CO_2$ in a reservoir.

There are several types of electrolysis available, the most common being alkaline electrolysis. Other methods comprise polymer electrolyte membrane electrolysis, carbonate electrolyte electrolysis, and solid-oxide electrolysis. The alkaline electrolysis cell has two electrodes separated by a diaphragm and operated in an alkaline solution of potassium or sodium hydroxide. The diaphragm facilitates transportation of hydroxide ions from one electrode to the other, and helps separate the evolved hydrogen and oxygen gases. The present invention does not rely on a specific method for producing hydrogen, but it is expected that methods with low carbon footprints are most relevant.

Carbon dioxide is available in large amounts; in particular there is presently approximately 410 ppm in the global atmosphere, steadily increasing. Adsorbents have been installed to capture $CO_2$ from the atmosphere for use in greenhouses on a small scale. Another source of $CO_2$ is from biomass; either through combustion or fermentation, or by photochemical or chemical processing. It has been assumed that such $CO_2$ does not contribute to the greenhouse effect and global warming. $CO_2$ is also readily available from several industrial processes; generally, from fired heaters or combustion turbines, but also as a main byproduct as in ammonia synthesis, hydrogen production, and cement manufacture. Large amounts of $CO_2$ evolve from deposits of municipal solid wastes, and from distributed heat systems. The main sources of man-made $CO_2$, however, is from utilizing gas, oil and coal in electricity production and in the transportation sector. The present invention does not rely on a specific source of $CO_2$, but it is expected that $CO_2$ that give rise to overall low carbon footprint is most relevant.

Conversion of $CO_2$ and hydrogen to liquid hydrocarbons according to the present invention may be based on a 3-step procedure comprising: 1) producing synthesis gas (syngas) essentially comprising hydrogen and CO; 2) synthesis gas conversion by Fischer-Tropsch (FT) synthesis; and 3) upgrading of raw FT products (wax and naphtha/distillates) to final products such as naphtha, kerosene, diesel or other products, for example lube oil base. Wax is also in itself a valuable product. The upgrading typically uses hydrogen in hydrogenation, hydrocracking and/or isomerization processes. Such upgrading stabilizes the products; by converting olefins to alkanes, and removing produced oxygenates; adjusting chain lengths to the desired region; and isomerizing alkanes to improve cold properties of the products. The upgrading may take place wholly or in part at the production site, or the products can be transported to a dedicated refinery.

FT synthesis can be classified as a High-Temperature FT (HTFT) process operating at 330-370° C. and Low-Temperature FT (LTFT) at 210-260° C. The former gives products mainly in the naphtha range containing linear and branched olefins with high aromatics and oxygenate content. The HTFT process may be practiced based on precipitated iron catalysts with stability and selectivity promoters. Preferably plants used for the disclosed process are of the LTFT type. In this process, typically, a cobalt based catalyst converts syngas mainly to linear long-chained paraffins and some lighter olefins, a mixture of methane, petroleum gases, naphtha, kerosene and wax. The liquid and solid products can be upgraded by hydro-treating and -cracking to a clean-burning diesel fuel. Another favorable product is jet-fuel that for the most part is composed of naphtha and kerosene upgraded to specifications. Typical grades are Jet A, Jet A-1 and Jet B. The produced fuel may be virtually free of sulfur, aromatics and nitrogen compounds, and is excellent as a blending stock for conventional diesel. Supported cobalt catalysts may be the preferred catalysts for the FT synthesis. The most important properties of a cobalt FT catalyst are the activity, the selectivity, usually to $C_5$ and heavier products, and the resistance towards deactivation. Known catalysts are typically based on titania, silica or alumina supports, and various metals and metal oxides have been shown to be useful as promoters. The FT synthesis can be performed in several types of chemical reactors, the most common being fixed-bed tubular and slurry bubble column types. Other useful reactors comprise microchannel reactors; fluid-bed reactors; and reactors filled with internals like monoliths, sponges, or cassettes for direction of syngas flow and improved heat transfer by varying the catalyst and process conditions, the products may be directed at alternative products slates, e.g. containing larger amounts of olefins and/or oxygenates that then constitute part of the sought product slate.

The LTFT process concerns hydro-polymerization of carbon monoxide $$2n\ H_2 + n\ CO \rightarrow -(CH_2)_n - + n\ H_2O$$

to give linear alkanes by the overall reaction $$(2n+1)H_2 + n\ CO \rightarrow C_nH_{(2n+2)} + n\ H_2O\ \Delta H \sim 154\ kJ/mol$$
$$(\alpha = 0.95)$$

where n is the chain length of the carbon backbone. The most important side reactions are α-alkene formation by $$2n\ H_2 + n\ CO \rightarrow CH_2 n + n\ H_2O$$

and a separate reaction pathway to methane:

$$3H_2 + CO \rightarrow CH_4 + H_2O\ \Delta H = -88\ kJ/mol$$

On a schematic level, the feed molecules CO and $H_2$ may be activated on the surface of the FT metal, followed by hydrogenation of carbon and oxygen, chain growth by successively adding $-CH_2-$ monomer units and termination. Alkanes can be formed by hydrogenation of the growing chain, whereas β-hydrogen abstraction leads to α-alkenes. Further hydrogenation of surface $-CH_x$ gives methane. For each carbon unit in the product there will be one water molecule formed. It is to be understood that the above is only a schematic description of the FT-mechanism, and several mechanistic pathways have been proposed in the literature. For example, it is possible that the primary products are olefins, and that alkanes are made by secondary hydrogenation.

A wide range of chain lengths are produced by FT-synthesis as determined by the value of chain termination probability relative to chain growth probability. In general, the product slate follows the Anderson-Schultz-Flory (SFA) distribution as expressed by:

$$W_n/n = (1-\alpha)^2\alpha^{n-1}$$

where $W_n$ is the weight fraction of a chain with a given chain length n, and α defines the chain growth probability according to $$\alpha = r_p/(r_p + r_t).$$

Here, $r_p$ and $r_t$ are the reaction rates for propagation and termination, respectively. To minimize the production of light gases, it may be preferable to have as high a as possible, defined by the actual catalyst used and the process conditions.

The $H_2/CO$ usage ratio in the LTFT-synthesis is in the range 2.1 to 2.2 depending on $\alpha$ and to some extent on the selectivity to other products but alkanes. Another important characteristic of the FT-reaction is its high exothermicity as given above. The actual enthalpy of reaction varies with the polymerization probability, the olefin to paraffin ratio, deviations from ASF distribution, methane selectivity and by-products formation. Handling the heat evolved greatly influences the reactor and process designs. For fixed-bed and slurry reactors it is convenient to remove heat and control the reaction temperature by boiling water. Analysis of the FT reactions gives a preferred range of process conditions for LTFT synthesis that may include one or more of:

Operating temperature between 210 and 260° C. At the high end there may be unfavorable production of light gases including methane. Further, accelerated deactivation should be considered. On the other hand, reaction rates may be high and steam produced by the reaction heat may be obtained at favorable pressure. Too low temperatures may be prohibited by low reaction rates.

Elevated reaction pressure. Process intensification dictates a reaction pressure of at least 10 bar, and most XTL processes operate in the range 25-30 bar, but even higher pressures should be considered. High pressures favor high conversion rates and formation of long chained hydrocarbons.

An effective $H_2/CO$ ratio in the feed to the FT reactor close to or slightly below two. As this is below the consumption ratio, the $H_2/CO$ ratio is reduced further along the reaction pathway favoring synthesis of long hydrocarbon chains.

Syngas produced from $CO_2$ and hydrogen can be used for a multitude of chemical processes, i.e. not only for FT-synthesis. An alternative application is synthesis of methanol through the reactions $$2H_2+CO=CH_3OH$$

$$3H_2+CO_2=CH_3OH+H_2O$$

Another alternative application of synthesis gas is production of synthetic natural gas:

$$3H_2+CO=CH_4+H_2O$$

The present disclosure includes a number of examples where syngas is produced.

The syngas may be cleaned and pre-treated in a suitable manner so that the gas fed to the FT-reactor(s) for the most part consists of CO and hydrogen. Such cleaning may include sulfur removal, e.g. in a ZnO absorber. Active carbon and/or zeolites may be used to remove other trace impurities like ammonia and metal carbonyls. Syngas may be produced by mixing hydrogen with $CO_2$ and shifting $CO_2$ to CO in the RWGS reactor. Due to the recycling of unconverted syngas, and optionally using a pre-reformer, the feed to the RWGS reactor may comprise hydrogen, CO, $CO_2$, steam and some methane. Between these components there is an equilibrium relation given by the stoichiometric equation:

$$CO+H_2O=CO_2+H_2$$

This reaction is called the water-gas-shift reaction, and by operating a shift reactor at certain conditions the equilibrium can be forced to the left, thereby the denotation reverse water-gas-shift (RWGS). A gas mixture may be obtained which is rich in carbon monoxide, and where the concentration of carbon dioxide is minimized. Shifting the reaction toward CO is favored by high temperature and high partial pressure of hydrogen. Excess hydrogen in the process may be required in any case because hydrogen is a key component in the final syngas. Improved reaction velocity may be provided by use of suitable catalysts. It is understood, however, that at high temperatures, above 800° C., preferably above 1000° C., a catalyst may not be needed. Such high temperatures useful for RWGS can be achieved by using oxygen combustion of feed gases, in particular partial oxidation of methane and other hydrocarbons. Another benefit of high temperature is that the amount of residual methane is reduced; often denoted as "methane slip". Methane is inert in the Fischer-Tropsch process and, therefore, for a large part is recycled back to the reformer for conversion to synthesis gas. The amount of methane in the make-up synthesis gas fed to FT should be as low as possible, at least less than 10 vol %.

The shift process is nearly pressure independent and the same pressure as in other process units may be used. In a traditional "high-temperature" shift reactor, typical exit temperature is 420° C. Note that "high-temperature" here refers to a different temperature range than for a FT-reactor, and for the reverse water-gas-shift reaction much higher temperatures can be applied. A catalyst for the traditional "high-temperature" shift reactor may be based on chromium and/or iron.

From the above water-gas-shift equation, it can be seen that water in the feed is not beneficial for the RWGS reaction according to Le Chatelier's principle. However, some steam and/or $CO_2$ is expected to be required to suppress coking in feed lines if RWGS is carried out at temperatures above 500-600° C. Methane may also be present in minor amounts, e.g. below 10 mol % or more typically between 1 and 3 mol %. Methane is inert to the FT-reaction. Some methane may be produced by the FT-reaction. If this methane is not removed by a purge stream, it may accumulate in the system due to recycling. A purge stream may remove carbon from the system, and thereby reduce the overall product yield. It should be noted that some purge may be required, e.g. if residual nitrogen and other inert gases are to be removed. A preferred option may be to convert the methane in the RWGS-reactor itself. This reactor then becomes a combined RWGS and steam methane reformer (SMR). An SMR typically employs a catalyst based on nickel as active metal on a high-temperature support material, like a spinel compound or alumina. The SMR catalyst may also work synergistically to increase the reaction rate and secure equilibrium of the RWGS reaction. The following chemical reaction takes place by steam reforming of methane:

$$CH_4+H_2O=CO+3H_2$$

in addition to the shift reaction. Accordingly, more syngas thus may be produced ready for being converted to products. The heat of reaction for steam reforming is strongly endothermic, coming in addition to the endothermicity of the RWGS reaction. However, the amount of methane may be limited. In any case, a significant temperature drop may be experienced if additional heat is not provided. It may be necessary to heat the gaseous stream(s) to the RWGS. Additional heat may be provided by suitable means, e.g. electrical resistance or inductive heating. Internal or external combustion is also a possibility. In the latter cases, oxygen produced by electrolysis of water can be used.

The above described RWGS-SMR reactor is very different from a traditional SMR reactor. In the traditional SMR reactor, methane is converted in a tube reactor at high temperature and moderate pressure. A world-scale steam reformer consists of many reactor tubes, e.g. 200-250 tubes with typical lengths of 12-13 meters, inside diameter of about 10 cm and an outside diameter of about 12 cm. This is a space demanding unit with a length of 30-50 meters, width of 10-12 meters and a height of 15-20 meters. Conventional steam reformers are operated in the pressure range from 15 to 30 bar. The outlet temperature of the gas from a conventional steam reformer lies in the temperature area of 950° C. The energy which is used to carry out the endothermic reactions is supplied by external firing/heating (top-, side-, bottom- or terrace-fired). The ratio between steam and carbon is from 2.5 to 3.5, and the ratio between hydrogen and carbon monoxide in the product stream is from 2.7 to 3.0.

Alternatively, the reforming of natural gas can take place in an autothermal reformer (ATR). In an ATR methane is fed together with oxygen, enriched air or air into a combustion chamber (burner). The energy which is required to operate the endothermic steam reforming reactions is provided by the exothermic reactions between methane and/or hydrogen and oxygen according to the equation $$CH_4 + \frac{1}{2}O_2 \rightarrow CO + 2H_2.$$

The temperature in the combustion chamber can reach more than 1500° C., or more than 2000° C. After the combustion chamber the reactions are driven to equilibrium over a catalyst bed before the synthesis gas is leaving the reactor at approximately 1000-1050° C. The size of such a unit could be a height of 10-15 meters and a diameter of 5-6 meters. Typical ratio of steam:carbon is from 0.6 to 1.4. Steam is often in part mixed with the oxygen, at least when pure oxygen is used. Pure oxygen is very reactive and mixing with steam may make handling easier.

The catalyst used in ATR is most frequently composed of nickel on a high temperature stable support material. Sometimes palladium may be used, e.g. in the upper part of the catalyst bed. A high temperature inert material is often used on top of the catalyst bed to protect the catalyst from imminent exposure to the hot gases from the burner, and/or in the lower part to secure support for the catalyst. The inert material may be composed of a high temperature stable material that may comprise one or more of alumina, magnesia, magnesium oxide, silica, zirconia and titania. Specifically, the inert material can be α-alumina, a spinel compound or cordierite. The latter, $2MgO_2Al_2O_35SiO_2$, is often used as support material in exhaust catalysts in the form of monoliths. Oher suitable shapes of inert materials or catalyst supports are in the form of spheres, extrudates, tubes, and wagon wheels. Tubes are sometimes referred to as Raschig rings.

A further option for reforming natural gas is a partial oxidation reactor (POX) which also is an autothermal reformer except that the unit does not comprise a catalyst bed. Conventionally, the exit gas is cooled down rapidly using a waste-heat-boiler (WHB) that produces steam. Rapid cooling and using tubes with boiling water are important to be able to control material corrosion by metal dusting.

Pre-treatment of recycled gas to the RWGS reactor may comprise pre-reforming, whereby higher hydrocarbons like ethane is converted by steam to methane and $CO_2$. The pre-reforming may take place at a pressure within the interval 5 to 200 bar, preferably between 10 and 30 bar. The pre-reforming may take place at a temperature between 300 and 700° C. Reactions in a pre-reformer are exemplified by:

$$C_3H_8 + 2H_2O \rightarrow CO_2 + 2CH_4 + H_2$$

and $$CH_3OH + H_2O \rightarrow CO_2 + 3H_2.$$

Both propane and methanol, as examples of hydrocarbons and oxygenates, may be transformed into gaseous molecules that already are present in the feed streams to the process, in addition to methane. The main benefit of having a pre-reformer may be that molecules prone to coking are removed from the system. It is also possible to deliberately remove and recycle additional light components from the liquid hydrocarbon product to the pre-reformer, by flashing at a desired temperature.

Certain aspects of the RWGS-reactor are described above. There is, however, a possible disadvantage when this reactor, or a combined RWGS-SMR reactor, contains a catalyst like a catalyst comprising nickel, as nickel under certain process conditions and certain feed compositions is prone to coking; i.e. soot formation. Surprisingly, using a pre-reformer might not be necessary, and an alternative way has been found to suppress coking. The reactor used is termed a syngas reactor, but still the RWGS reaction is the principle reaction that proceed. The reactions to be suppressed comprise:

| | |
|---|---|
| $CO_2 \rightarrow CO + C$, | the Boudouard reaction |
| $C_nH_{n+2} \rightarrow$, $C_n + n\,H_2$, | coking |
| $CH_4 \rightarrow C + 2\,H_2$, | methane decomposition |
| $CO + H_2 \rightarrow C + H_2O$. | CO reduction |

The last reaction is a reformulation of the Boudouard reaction combined with the RWGS reaction. CO reduction may be suppressed by having steam in the feed to the reactor. Such steam can be added to any of feed lines, i.e. for recycle gas, oxygen or $CO_2$ as long as the temperature does not exceed a critical value for the reaction to proceed. In particular, it is advantageous to add steam to the recycle gas containing CO. One possibility is to use steam generated by cooling the FT reactor(s). In case a pre-reformer is used, steam is added before this processing unit as described above. In addition to steam being active for coke inhibition, the amount of oxygen added can be such that it combusts any soot that unintentionally forms.

Example 1

Figure 1:
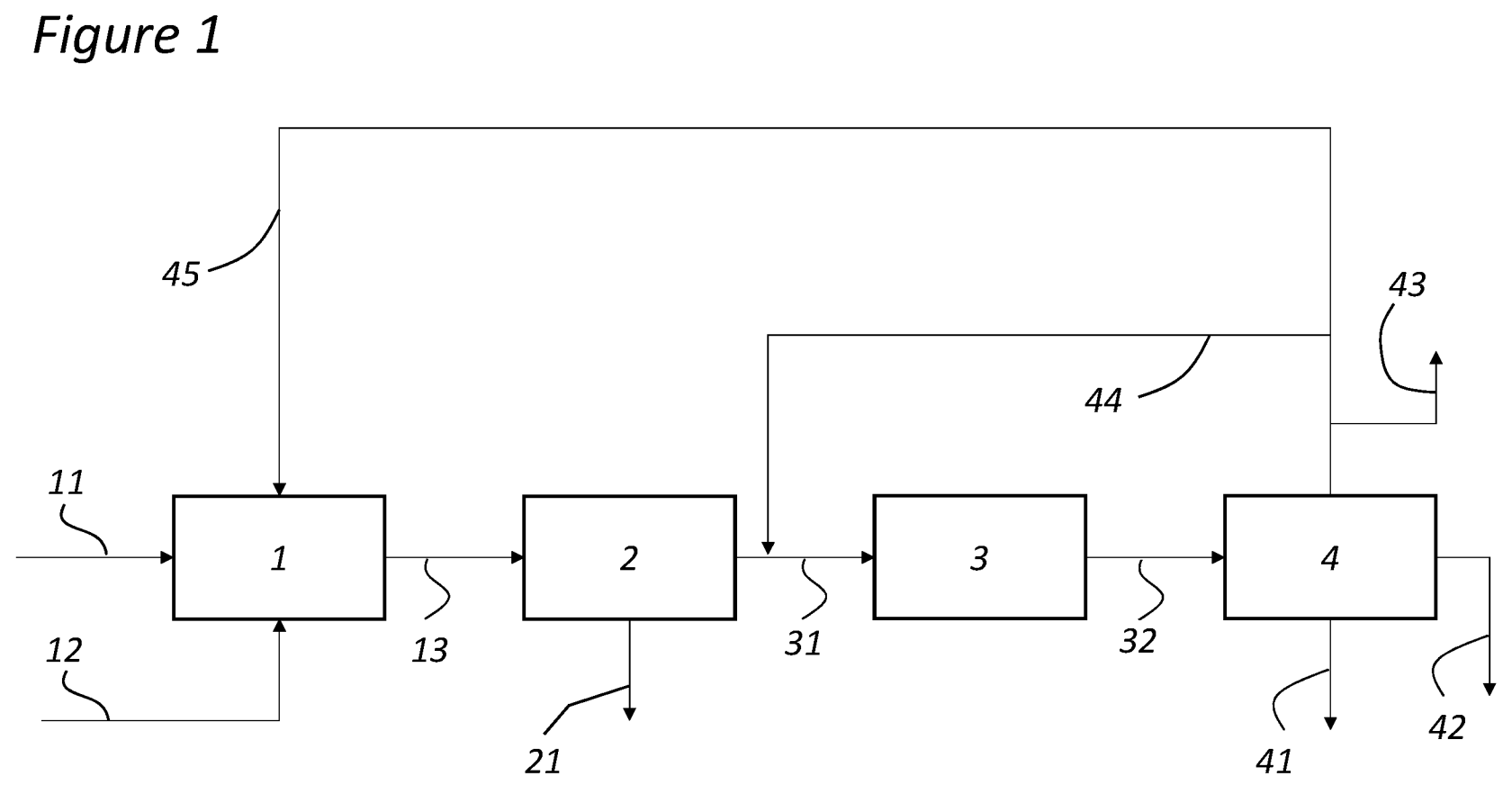

FIG. 1 shows a first example process according to the present invention. $CO_2$ in stream 11 is fed to a reactor or reactors 1 (i.e. first reactor). In this example, the reactor 1 is a reverse water-gas-shift (RWGS) reactor. The $CO_2$ is of specified purity and may have been purified by additional means, e.g. to remove traces of sulfur. It is also possible that the $CO_2$ contains a certain amount of nitrogen that has to be purged through stream 43. Hydrogen is fed to the RWGS reactor 1 through line 12. The hydrogen can come from any viable source, e.g. produced by electrolysis of water. The process units 1, 2, 3, and 4 may be operated at elevated pressures typically between 10 and 60 bar, preferably in the range 25-40 bar. Accordingly, both feed streams of hydrogen and $CO_2$ may be pressurized to operating pressure before entering RWGS. It is understood that the process units can be operated at the same or different elevated pressures.

The shifted gas 13 now contains a significant amount of syngas composed of CO and hydrogen in desired ratio, in addition to steam, unconverted $CO_2$, residual methane and sometimes nitrogen contained in feed stream(s). This steam is mostly produced in the RWGS reactor 1, but may also be added to the feed line 45. Methane, other hydrocarbons, $CO_2$ and unconverted syngas also enters the RWGS reactor through line 45, and might be converted in a significant amount to syngas. However, if the RWGS reactor is operated at a lower temperature, say below 800° C. or below 600° C., or without a suitable catalyst, methane may need to be removed from the synthesis loop through the purge stream 43. In certain embodiments it is a significant advantage to avoid or reduce purging of methane to obtain highest possible conversion of $CO_2$ to desired products; i.e. high carbon efficiency of the process.

Before entering the Fischer-Tropsch reactor 3 (i.e. second reactor), the raw syngas in stream 13 may be cooled down (not shown) and enters the process units 2 for cleaning and adjustments. In particular, water may be knocked out, and leave the synthesis loop in stream 21. The syngas is also preferably cleaned for impurities as particularly a Co-based FT-catalyst is highly sensitive to certain impurities. Other operations that might be included in units 2, are separation of unconverted $CO_2$ and addition of hydrogen for further adjustment of the $H_2/CO$ ratio. Syngas ready for FT-synthesis in reactor 3 enters through stream 31 together with recycled unconverted gas in stream 44. This recycled gas contains, in addition to unconverted syngas, part of produced light gases comprising mostly methane, but also some $CO_2$, light hydrocarbons, oxygenates and a variable amount of nitrogen. FT-products and unconverted gas leaves the FT-reactor in stream 32 that is composed of two sub-streams, a gaseous stream and a liquid stream. It is understood that there might be several FT-reactors in parallel or in series, possibly with addition of hydrogen between them and knocking-out produced water.

Evidently, the separation system 4 after the FT-reactor is grossly simplified, and separate treatments of the gaseous and liquid effluents are practiced. The liquid stream 42 represents the main product and goes to storage and shipment, possibly after stabilization and light or deep upgrading like hydro-treatment. The gaseous effluent from the FT-reactor may be cooled down in a three-phase separator. The lower part contains produced water by the FT-reaction, stream 41, while liquid hydrocarbons are added to the product slate, preferably in separate storage tanks as this product is lighter that the primary liquid from reactor 3. It is understood that there are a multitude of options in FT-product separation, treatment and upgrading.

The gas from the three-phase separator contains unconverted syngas, produced light hydrocarbons and $CO_2$. In order to achieve high carbon efficiency in the process, it is required that $CO_2$ and the gaseous hydrocarbons are converted to CO. Simultaneously, there may be two other requirements; high CO conversion is sought in the FT-reactor loop, and nitrogen and other inert components need to be purged from the system. Therefore, the gaseous effluent is split into three parts; the purge 43, syngas recycle 44 back to the FT-reactor, and the outer recycle 45 that ends up in the RWGS reactor.

Example 2

Figure 2:
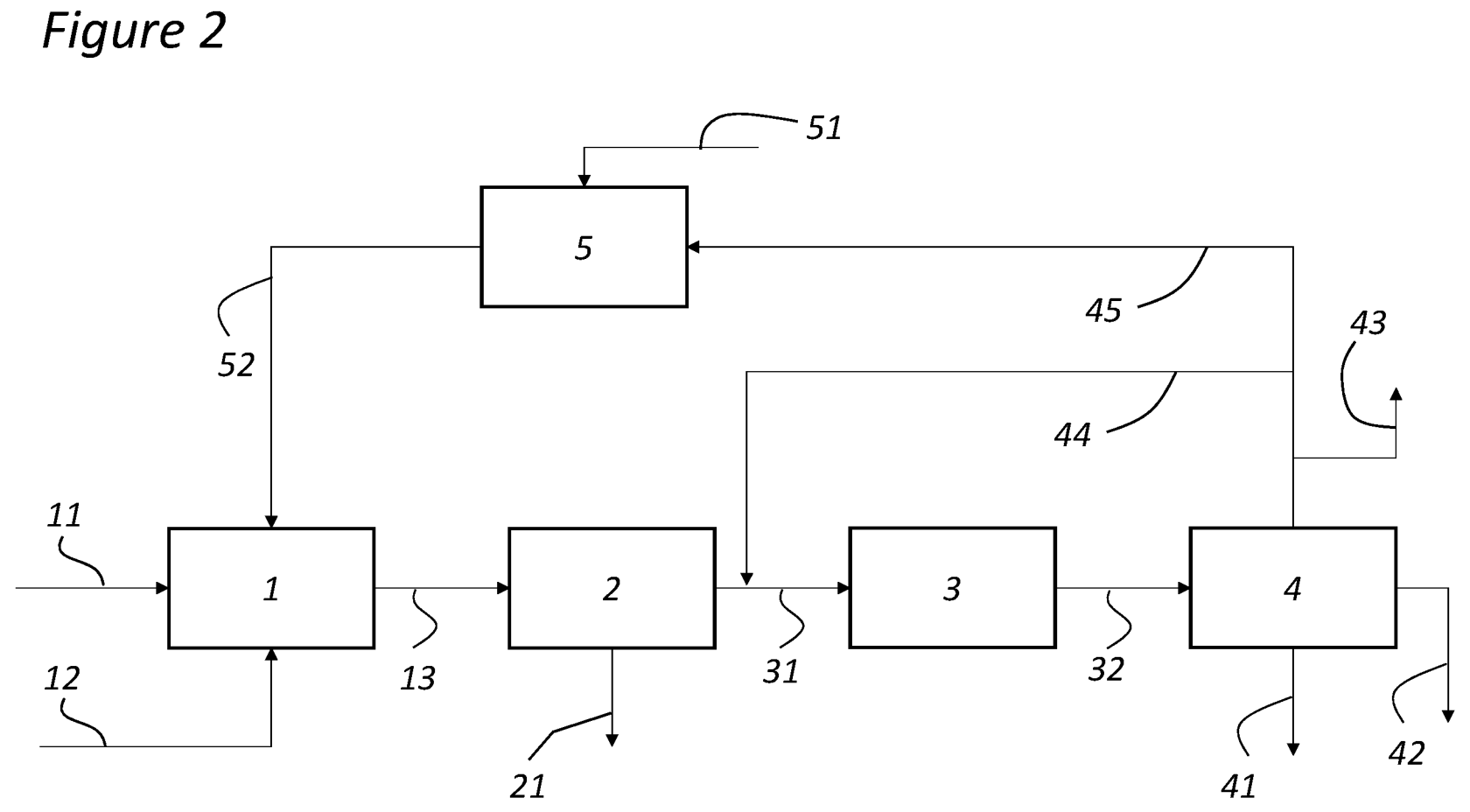

FIG. 2 shows a second example process according to the present invention. Compared to the first example process, a pre-reformer is added to the outer recycle loop. All process units and streams are as described in relation to the first example process in FIG. 1, except that now recycle stream 45 is directed to the pre-reformer 5. The recycle stream 45, before entering the RWGS reactor 1, passes through the pre-reformer 5. The pre-reformer 5 converts hydrocarbons, and oxygenates, to methane and $CO_2$ which both can be converted to syngas in a combined RWGS-SMR reactor. In order for the pre-reformer reactions to proceed, steam in stream 51 has to be added. Thus, the stream 52 from the pre-reformer to the RWGS-SMR reactor 1 contains both recycled CO and hydrogen, $CO_2$, methane and steam. The stream 52 is combined with fresh $CO_2$ and hydrogen for conversion to syngas in the RWGS-SMR reactor 1 by steam reforming and the reverse water-gas-shift reaction.

By using a pre-reformer, carbonaceous products that otherwise would not end up in the liquid products, may be converted to CO that is further converted by the FT-reaction. In addition, light hydrocarbons that are prone to coking at elevated temperatures may be removed. There may also be a third synergistic effect of feeding methane to the RWGS-SMR reactor. As methane is converted according to $$CH_4 + H_2O \rightarrow CO + 3H_2$$

and $CO_2$ according to $$CO_2 + H_2 \rightarrow CO + H_2O.$$

According to Le Chatelier's principle, both consumption of steam and production of hydrogen in the steam reforming reaction favors conversion of $CO_2$ by the RWGS reaction. The overall reaction becomes $$CH_4 + CO_2 \rightarrow 2\ CO + 2H_2$$

also denoted as dry reforming.

Example 3

FIG. 3 shows a RWGS reactor 1 (i.e. first reactor, which also can be referred to as a syngas reactor) according to a third example process according to the present invention. The third example process is concerned with mixing of gases fed into the RWGS reactor 1 in order to avoid or suppress the aforementioned concerns as to coking and insufficient conversion of methane and possibly higher hydrocarbons. The principle of mixing of gases in illustrated in FIG. 3. The feed streams of $CO_2$ 11 and hydrogen 12, the recycle stream 45, or 52, and the exit stream of syngas 13 may be as described in relation to the first or second example processes shown in FIGS. 1 and 2. There is also an optional line 18 for adding steam to the recycle stream 45. If a pre-reformer is not included, it may be preferable to add steam to suppress coke formation as the stream is optionally heated and enters the reactor.

According to the third example process, at least part of the $CO_2$ may be mixed with the recycled gas; the latter is sometimes denoted as tail-gas. Feeding of $CO_2$ in this position may suppress coke formation. The mixed streams of $CO_2$ and recycled gas may be fed into a first region of the RWGS reactor, e.g. the top of the RWGS reactor together with a stream of oxygen 14. It is understood that the RWGS reactor can be arranged in any spatial direction, meaning that what is referred to as top position sometimes can be lower position or horizontal position. The oxygen may be pure oxygen, enriched oxygen or even air. If oxygen is used, as from an air separation unit or from electrolysis, it can be advantageous to dilute the oxygen with an inert gas 17. The inert gas can be steam and/or a portion of the $CO_2$ 11.

Alternatively, or additionally, hydrogen 12 may be fed to the RWGS reactor at a second region, e.g. a lower position than the oxygen/$CO_2$/recycle gas feed. The purpose of feeding hydrogen in this position may be to avoid all the oxygen being used to combust hydrogen, and that sufficient oxygen is present in the first portion so that methane and higher hydrocarbons may be combusted, or at least partially reformed to syngas, meaning for methane that $$CH_4+O_2 \rightarrow CO+CO_2+H_2O.$$

Alternatively, or additionally, some $CO_2$ 16 may be mixed with hydrogen 12 or fed directly to the second portion of the reactor, e.g. at the lower position. Reversely, an option is to feed some hydrogen 15 to the upper position. Having the flexibility to feed at least some hydrogen and $CO_2$ to the first or second regions may allow adjustments of conditions for complete, or near complete, conversion of hydrocarbons, suppressing coke formation, and adjusting temperature in sections of the RWGS reactor.

Further, the third example process may allow conversion of carbon atoms in the recycled gas to CO and $CO_2$ without the use of a catalyst. Further, coke formation may be suppressed.

Example 4

Figure 4:
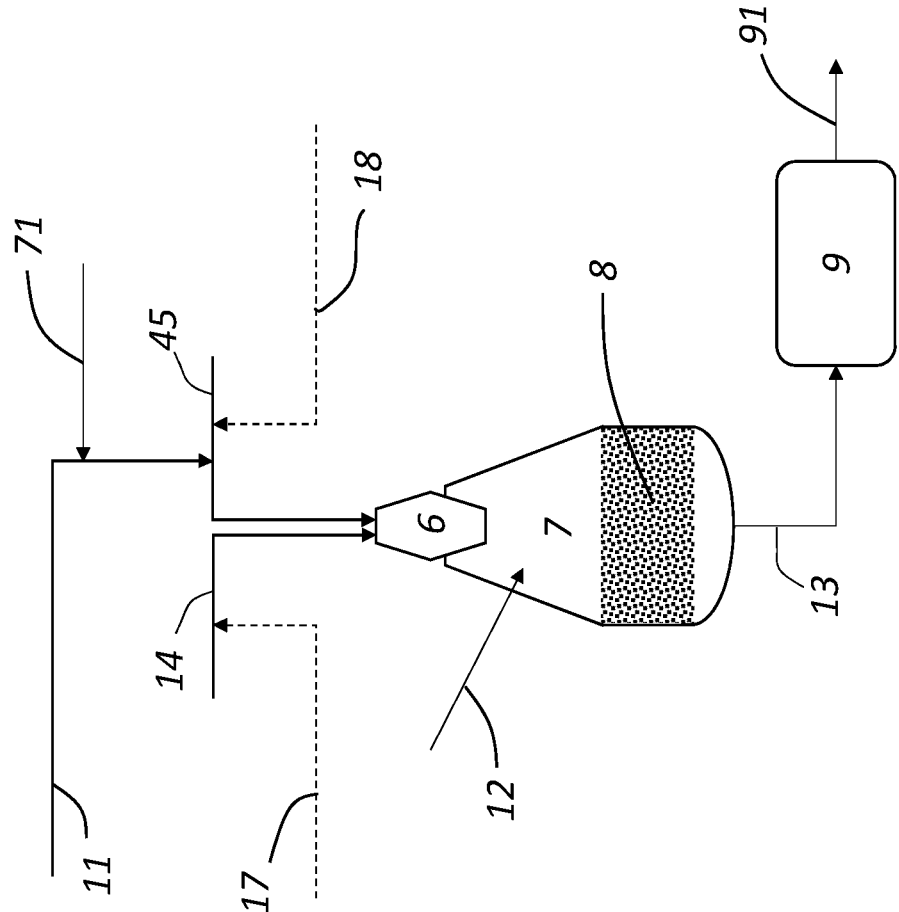
FIG. 4 schematically shows a first reactor for a fourth example process.

FIG. 4 shows a RWGS reactor 1 (i.e. first reactor, or syngas reactor) according to a fourth example process according to the present invention. The $CO_2$ 11, oxygen 14, possibly diluted with steam and/or $CO_2$ 17, and recycle-gas 45, possibly diluted with steam 18, are fed to a burner 6 where the fuel components are combusted to water and $CO_2$ with possibly some CO. The burner 6 corresponds to a first region of the reactor 1. After hydrogen 12 is added to the reactor 7, at a second region of the reactor 1, equilibrium is formed as the gas mixture passes the inert filling material 8, and the syngas 13 leaves the reactor. At least a significant portion of the hydrogen may be added to the second region, as too much hydrogen in the first region, e.g. added as stream 15 of FIG. 3, competes with partial oxidation of hydrocarbons in the recycle stream 45. The reactor 7 is a variation of the RWGS reactor 1 and is similar to an autothermal reactor (ATR); being defined as a reactor where the exit temperature is defined by the reactions in the reactor without any deliberate addition or removal of heat. An ATR reactor may be used for reforming of natural gas for Fischer-Tropsch, methanol and ammonia production processes. In a conventional ATR or other natural gas reformer, the filling is a catalyst that contains nickel, sometimes palladium or other transition or noble metals, and is used to equilibrate the reaction mixture when the feed contains a large component of hydrocarbons. This is unlike the present example process where the hydrocarbons compose a limited fraction compared to $CO_2$ as the main carbon source. Further, the gas composition is designed as to force the hydrocarbons to be wholly or partially combusted in the burner. However, it is possible to add an additional fuel component 71. This fuel component can for example be methane, natural gas, methanol, or another combustible component, or mixtures thereof.

The inert material 8 may comprise pellets of ceramic materials like alumina, magnesia, calcium oxide, silica, zirconia, titania and the like or mixtures thereof. The pellets may be porous, e.g. with surface areas below 50 $m^2$/g, more typically below 15 $m^2$/g or sometimes below 5 $m^2$/g. The shape of the pellets may be in any suitable form, e.g. spheres, cylinders, tubes or wagon wheels. The inert material preferably does not contain nickel, or at least reducible nickel. Although the inert material is not what is commonly known as a catalyst, this does not exclude that the surface of the material has a positive effect on the gas phase reactions and equilibration in that formation of radicals may be promoted.

Also shown in FIG. 4 is the unit 9 which is used to cool down the formed syngas giving the cooled syngas 91. There are several ways to perform the cooling including a gas-gas heat exchanger, direct cooling by water that is sprayed in, and using a waste-heat boiler. Rapid cooling of a produced high-temperature gas is often denoted as quenching, in particular when cooling is by direct water injection. Injection of hydrogen of a designated temperature to the second zone of the first reactor may contribute to cooling of the produced syngas. In particular, it may be important to cool the syngas rapidly to a temperature where no or minimal back-reaction occurs. A waste-heat boiler contains tubes in which water at high pressure is evaporated. The primary cooled down syngas may be subject to further cooling down to a temperature feasible for the next process steps.

Figure 5:
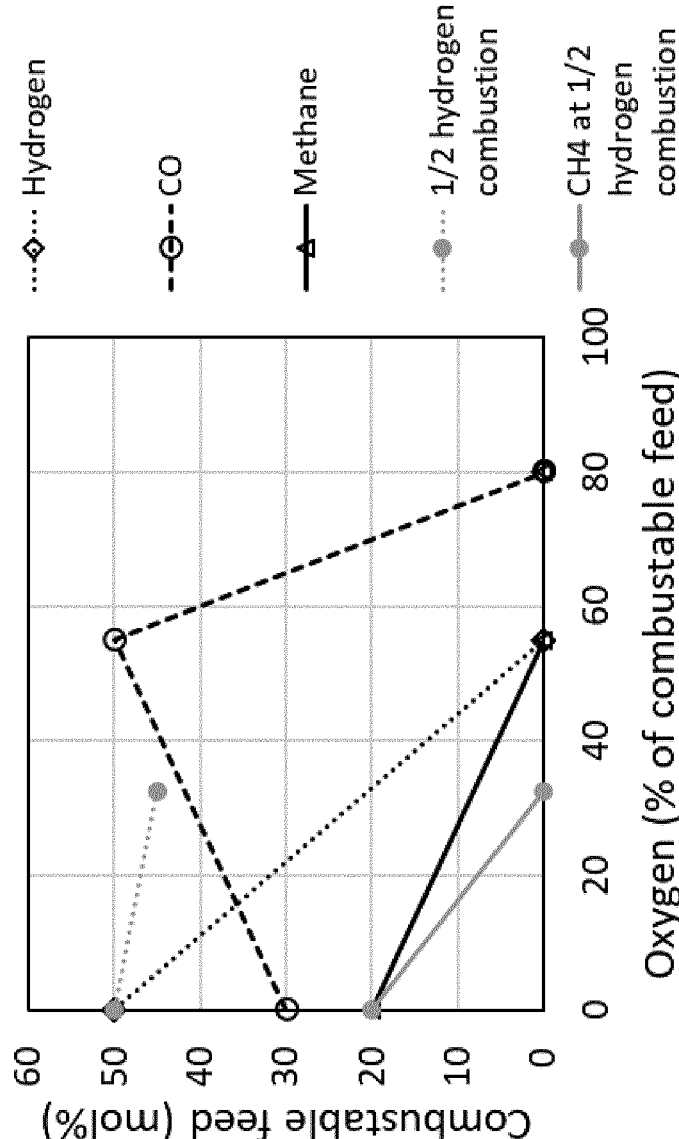
FIG. 5 is a graph showing gas composition within a first portion of the first reactor shown in FIG. 4.

FIG. 5 illustrates compositional changes that may occur in the burner of the fourth example process. The recycled gas 45 is assumed to be composed of 50 moles hydrogen, 30 moles CO and 20 moles $CH_4$. This composition can be reasonably close to a typical composition except that non-combustible components like nitrogen, water and $CO_2$, including added $CO_2$ 11, are left out as they do not contribute to oxygen consumption. The methane represents also $C_2$-$C_5$ hydrocarbons and oxygenates in the recycle gas. In any case, this composition illustrates the preferred performance in the burner. At all oxygen additions, it is assumed that hydrogen kinetically is combusted first along with reforming of methane, and at last CO is fully converted to $CO_2$. A detailed kinetic analysis shows this model to be an approximation as there only partly is a combustion of hydrogen concurrent with partial oxidation of methane. Still, the approximated behaviour in FIG. 5 serves to exemplify the principle of the present technology. The final temperature modelled was 1550° C. However, lower or higher temperatures are achieved in the burner part of the reactor depending on amount of oxygen added and pre-heating of the feed gases; e.g. 1200° C. can be achieved or temperatures above 1800° C. Up to 55 moles of added oxygen, hydrogen is oxidized to water, methane disappears, and CO increases due to the partial oxidation of methane. Complete combustion is reached at 80 moles $O_2$. In practice, this example shows that between 55 and 80 mol % $O_2$ may be added to the combustible feed to convert methane and avoid excess oxygen. Total combustion is reached at $$[O_2]^\circ = \tfrac{1}{2}[H_2]^\circ + \tfrac{1}{2}[CO]^\circ + 2[CH_4]^\circ$$

and partial oxidation of methane to CO and water along with hydrogen combustion is reached at $$[O_2]^\circ = \tfrac{1}{2}[H_2]^\circ + 1\tfrac{1}{2}[CH_4]^\circ.$$

Only combustion of half of the hydrogen fed and generated is reached at $[O_2]^\circ = \tfrac{1}{4}[H_2]^\circ + [CH_4]^\circ$; corresponding to 32.5 mol % of the combustible feed in the above example. This behaviour is shown in FIG. 5 by the lines ending at 32.5% $O_2$ for hydrogen and methane; CO follows the original line to this value of oxygen.

The above-mentioned kinetic modelling was also conducted for the second region of the first reactor, i.e. for equilibration after all hydrogen has been fed above the inert material. The model shows that the RWGS reaction is very fast, reaching equilibrium in less than 50 milliseconds, at least faster than 1 second. On the other hand, backreaction to methane by $$CO+3H_2 \rightarrow CH_4+H_2O$$

is much slower; methane not reaching 0.1% of CO in 1 second, perhaps not even 0.02%. This shows that feasible gas velocities can be applied for conducting the present invention giving the desired syngas composition.

Example 5

Figure 6:
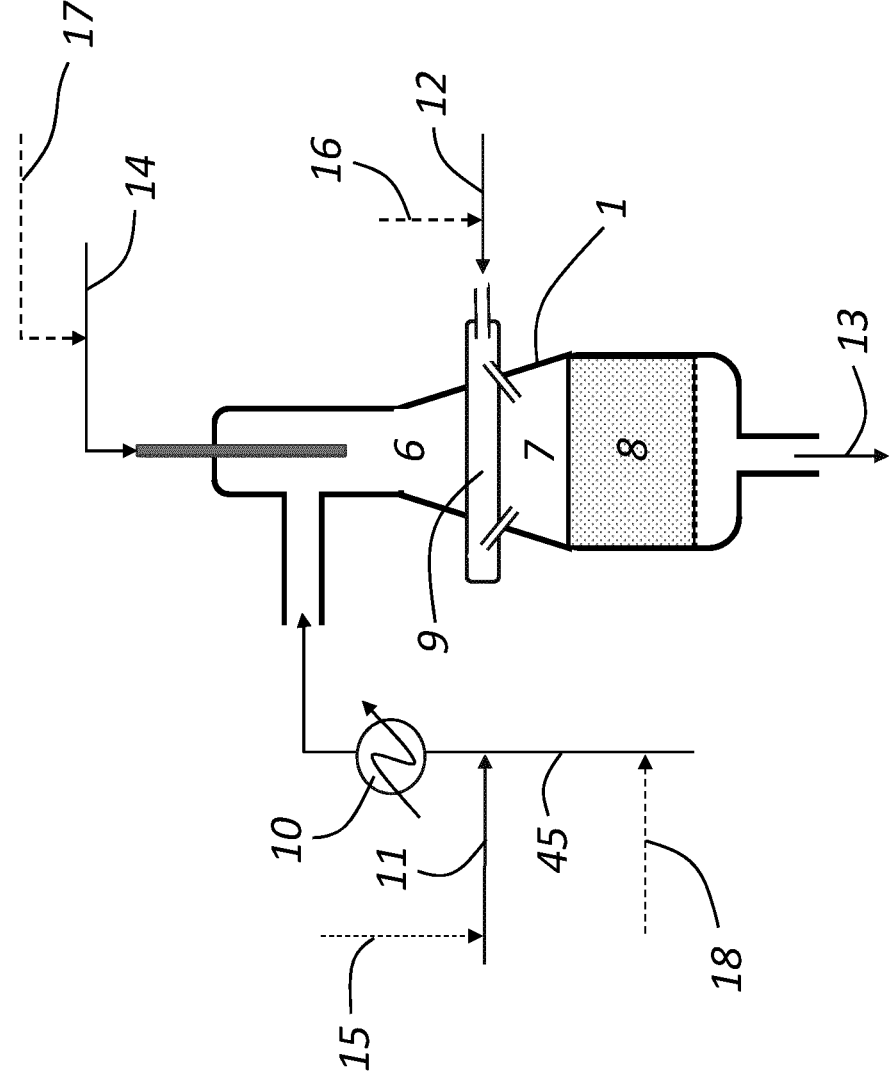
FIG. 6 schematically shows a first reactor for a fifth example process.

FIG. 6 shows one further example of a RWGS reactor 1 (i.e. first reactor or syngas reactor) according to a fifth example process according to the present invention. This design is more detailed than in FIGS. 3 and 4 and have corresponding reference signs. The principles of gas mixtures and feeding points are the same, although the sequence of mixing gases can be varied, e.g. additional hydrogen 15 can be mixed with $CO_2$ 11 or with the recycle gas 45. In particular, two elements are highlighted in the figure.

Example systems may have one or both of these features First, in the second region 7, where hydrogen 12 is mixed with the partially oxidized gas from the first region 6, the feeding system 9 for hydrogen is illustrated as a feed ring surrounding the RWGS reactor 1 with feed lines intruding the reactor at certain points around the periphery. There typically are between 4 and 16 feed lines for hydrogen.

Second, a heat exchanger 10 is shown for heating $CO_2$ and/or recycle gas before it enters the reactor 1. Heat management and design is an important part of a plant for producing hydrocarbons from $CO_2$ and hydrogen. The energy in the hot syngas 13, and/or heat produced in the second reactor 3, can be utilized for valuable purposes like heating feed gases to the RWGS reactor. The present invention may be compatible with all variations of heat integration as long as reaction temperatures are achieved that can produce syngas in reactor 1 and second hydrocarbons in reactor 3. Additional heat may be required, using an external heat source, and/or implementing a fired heater. Such a fired heater can at least in part be fuelled by the purge gas 43 shown in FIGS. 1 and 2.

Variations of the above described examples are possible in light of the above teachings. It is to be understood that the invention may be practised otherwise than specifically described herein without departing from the spirit and scope of the invention.

The invention claimed is:

1. A syngas production process, comprising:
receiving, by the syngas production process, a feed stream that comprises carbon dioxide, wherein the received carbon dioxide is the main carbon source of the syngas production process;
supplying the feed stream to a first reactor;
generating syngas in the first reactor in dependence on at least some of the carbon dioxide in the feed stream, wherein the syngas comprises carbon monoxide and hydrogen; and
outputting the syngas from the first reactor;
wherein the syngas production process further comprises:
further receiving, by the first reactor, hydrogen and first hydrocarbons;
at least partially oxidizing the first hydrocarbons in a first region of the first reactor; and generating, in a second region of the first reactor, the syngas at least partially in dependence on carbon dioxide from the feed stream, hydrogen and the oxidized first hydrocarbons;
wherein at least a portion of the first hydrocarbons fed into the first reactor are recycled second hydrocarbons that have been generated in dependence on syngas output from the first reactor.

2. The process of claim 1, wherein:
the syngas generated in the first reactor is supplied to a second reactor that is a Fischer-Tropsch (FT) reactor; and
the second hydrocarbons are generated in the second reactor.

3. The process of claim 1, wherein oxygen is fed into the first region of the first reactor.

4. The process of claim 1, wherein oxygen is fed into the first region of the first reactor;
wherein the oxygen is mixed with steam and/or a portion of the carbon dioxide before entering the first region of the first reactor.

5. The process of claim 1, wherein a sufficient amount of oxygen is added such that no, or minimal soot, is formed.

6. The process of claim 1, wherein a sufficient amount of oxygen is added such that the temperature in the second region of the first reactor is beneficial for an reverse water-gas-shift (rWGS) reaction to proceed without a catalyst; the temperature being above 800° C..

7. The process of claim 1, wherein a sufficient amount of oxygen is added to minimize or reduce the amount of methane leaving the second region of the first reactor; the methane on volumetric basis being less than 10 vol %.

8. The process of claim 1, wherein the first region comprises a burner or partial oxidization reactor.

9. The process of claim 1, wherein the second region of the first reactor comprises a solid, inert material.

10. The process of claim 1, wherein the hydrogen is fed through a feed ring comprising multiple hydrogen feed lines penetrating a shell of the first reactor.

11. The process claim 1, wherein the hydrogen added to the second region of the first reactor, with subsequent reverse water-gas-shift (rWGS) reaction, cools the gas mixture to below 1200° C.

12. The process of claim 1, wherein:
a major portion of the carbon dioxide is fed into the first region of the first reactor, and/or a major portion of the hydrogen is fed into the second region of the first reactor;
a minor portion of the hydrogen is fed into the first region of the first reactor, and/or a minor portion of the carbon dioxide is fed into the second region of the first reactor.

13. The process of claim 1, wherein:
the hydrocarbons are mixed with carbon dioxide before being fed into the first reactor; and/or the hydrocarbons are mixed with steam before being fed into the first reactor.

14. The process of claim 1, wherein:
the hydrocarbons are mixed with carbon dioxide before being fed into the first reactor; and/or the hydrocarbons are mixed with steam before being fed into the first reactor; and
the hydrocarbons are mixed with steam in a pre-reformer, wherein the pre-reformer converts at least a portion of the first recycled hydrocarbons to methane and carbon dioxide.

15. The process of claim 1, wherein:

the hydrocarbons are mixed with a combustible fuel before being fed into the first reactor.

16. The process of claim 1, wherein the syngas is produced in the first reactor at least partly by a reverse water-gas-shift reaction, and/or wherein the syngas is produced in the first reactor at least partly by steam-methane reforming.

17. The process of claim 1, comprising:

removing carbon dioxide from the syngas produced in the first reactor and/or adding further hydrogen to the syngas produced in the first reactor.

18. The process according to claim 2, further comprising wherein at least a portion of the first hydrocarbons fed into the first reactor are first recycled hydrocarbons recycled from the second hydrocarbons produced in the second reactor;

removing liquid hydrocarbons produced in the second reactor, and optionally upgrading the liquid hydrocarbons produced in the second reactor; and removing water from the second hydrocarbons produced in the second reactor and/or removing unwanted gases comprising one or both of nitrogen and methane from the second hydrocarbons produced in the second reactor;

wherein the first and second hydrocarbons are produced in the second reactor by a FT process, optionally using a cobalt catalyst.

\* \* \* \* \*